(12) United States Patent
Yahata et al.

(10) Patent No.: US 9,325,691 B2
(45) Date of Patent: Apr. 26, 2016

(54) VIDEO MANAGEMENT METHOD AND VIDEO MANAGEMENT SYSTEM

(71) Applicant: PANASONIC INTELLECTUAL PROPERTY CORPORATION OF AMERICA, Torrance, CA (US)

(72) Inventors: Hiroshi Yahata, Osaka (JP); Aki Yoneda, Hyogo (JP); Taiji Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 79 days.

(21) Appl. No.: 14/359,655

(22) PCT Filed: Sep. 25, 2013

(86) PCT No.: PCT/JP2013/005673
§ 371 (c)(1),
(2) Date: May 21, 2014

(87) PCT Pub. No.: WO2014/050092
PCT Pub. Date: Apr. 3, 2014

(65) Prior Publication Data
US 2014/0289818 A1  Sep. 25, 2014

(30) Foreign Application Priority Data
Sep. 28, 2012  (JP) .................................. 2012-218177

(51) Int. Cl.
*G06F 21/00* (2013.01)
*H04L 29/06* (2006.01)
(Continued)

(52) U.S. Cl.
CPC ................ *H04L 63/08* (2013.01); *G06F 21/60* (2013.01); *G06F 21/6209* (2013.01); *H04N 21/25866* (2013.01); *H04N 21/2743* (2013.01); *H04N 21/854* (2013.01)

(58) Field of Classification Search
CPC ..... G06F 21/60; G06F 21/62; G06F 21/6209; G06F 21/6218; G06F 21/6245; G06F 21/6272
See application file for complete search history.

(56) References Cited

U.S. PATENT DOCUMENTS 8,187,104 B2   5/2012  Pearce
2008/0307311 A1*  12/2008  Eyal ...................... G01S 5/0205
                                                             715/733

(Continued)

FOREIGN PATENT DOCUMENTS

JP    2007-287131    11/2007
JP    2008-28970      2/2008

(Continued)

OTHER PUBLICATIONS

International Search Report issued Dec. 17, 2013 in corresponding International Application No. PCT/JP2013/005673.

*Primary Examiner* — Edward Zee
(74) *Attorney, Agent, or Firm* — Wenderoth, Lind & Ponack, L.L.P.

(57) ABSTRACT

A video management method includes: associating video information to be uploaded to a moving image distribution server by a user with user information indicating the user; storing the video information uploaded via the Internet into a storage unit; authorizing a different user to view the video information stored in the storage unit; and causing the user to select one process to be executed, at withdrawal of the user from a group, on the video information that the different user belonging to the group is authorized to view, the process being selected from among (i) deleting the video information; (ii) associating the video information with user information indicating the different user belonging to the group; and (iii) associating the video information with administrator information indicating a virtual administrator of the group.

10 Claims, 16 Drawing Sheets

(51) Int. Cl.
*G06F 21/62* (2013.01)
*G06F 21/60* (2013.01)
*H04N 21/2743* (2011.01)
*H04N 21/854* (2011.01)
*H04N 21/258* (2011.01)

(56) References Cited

U.S. PATENT DOCUMENTS

2009/0131177 A1 5/2009 Pearce
2009/0209335 A1 8/2009 Pearce
2012/0173638 A1* 7/2012 Vymenets ............ G06Q 10/103
 709/206
2012/0274846 A1* 11/2012 Kimura ............. G06F 17/30247
 348/441

FOREIGN PATENT DOCUMENTS

| | | |
|---|---|---|
| JP | 2010-529816 | 8/2010 |
| JP | 2011-512172 | 4/2011 |
| JP | 2011-134302 | 7/2011 |
| WO | 2008/154561 | 12/2008 |
| WO | 2009/094611 | 7/2009 |

* cited by examiner

| Group name | User name |
|---|---|
| Group A | User a |
| | User b |
| | Administrator |
| Group B | User c |
| | Administrator |
| Independent user | User d |
| | User e |

(b)

| Video | Management right | Publication destination group |
|---|---|---|
| Video 001 | User a | Group A |
| Video 002 | User b | Group A |
| ... | ... | ... |
| Video 005 | Administrator | Group B |
| ... | ... | ... |

FIG. 9

Select group you wish to withdraw from.

☐ Only family members (4)

☐ Imafuku Kindergarten (109)

☑ Imafuku Little League Soccer Club (32)

FIG. 10

Withdraw from "Imafuku Little League Soccer Club".

Select from among the following options for management of video information having been posted.

[Management of moving and still images having been posted]

☐ Delete all
☐ Delegate to specific group member
☑ Delegate to group administrator
☐ Decide by majority vote of group members
  (Delete all or delegate to administrator)

[Management of comments having been posted]

☐ Delete all
☐ Delegate to specific group member
☑ Delegate to group administrator
☐ Decide by majority vote of group members
  (Delete all or delegate to administrator)

VIDEO MANAGEMENT METHOD AND VIDEO MANAGEMENT SYSTEM

TECHNICAL FIELD

The present invention relates to a video management system and a video management method for sharing video content captured or created by a user with a different user other than the user capturing or creating the video content.

BACKGROUND ART

In recent years, moving image distribution services such as YouTube have enabled a large number of people to easily view various moving images on the Internet. By widely requesting general users to create content of moving images or the like, these moving image distribution services rely on the users to create and provide various content items. Receiving these various content items from the users, the moving image distribution services store the content items into moving image distribution servers to distribute the content items to an unspecified number of users. Then, a user as a viewer uses a function of searching by keywords to find a content item that the user is interested in, and then can view the content item in a streaming format.

CITATION LIST

Patent Literature

[PTL 1]
Japanese Unexamined Patent Application Publication No. 2008-28970

SUMMARY OF INVENTION

Technical Problem

The above conventional video distribution services have met the needs for setting a specific group and allowing only members of this group to view/share moving images. However, these conventional video distribution services have no system in the first place whereby a user having uploaded moving images transfers, at the withdrawal from a group, the right of management of video information including the moving images to another member of the group.

Thus, the present invention is conceived in view of the stated problem and has an object to provide a video management method whereby a user can transfer, at the withdrawal from a group, the right of management of video information to another member of the group.

Solution to Problem

In order to achieve the stated object, a video management method according to an aspect of the present invention is a video management method of managing video information which is uploaded to a server by a user belonging to a group including a virtual administrator and a plurality of users and which is viewable by at least one different user belonging to the group via the Internet using an information terminal, the video management method including: associating the video information to be uploaded to the server by the user with user information indicating the user; storing the video information uploaded via the Internet into a storage unit; authorizing the different user to view the video information stored in the storage unit, the different user belonging to the group to which the user indicated by the user information associated with the video information belongs; and causing the user to select one process to be executed, at withdrawal of the user from the group, on the video information that the different user belonging to the group is authorized to view, the process being selected from among (i) deleting the video information; (ii) associating the video information with user information indicating the at least one different user belonging to the group; and (iii) associating the video information with administrator information indicating the virtual administrator of the group.

These general and specific aspects may be implemented using a system, a method, an integrated circuit, a computer program, or a computer-readable recording medium such as a CD-ROM, or any combination of systems, method, integrated circuits, computer programs, or computer-readable recording media.

Advantageous Effects of Invention

The video management method and the video management system according to the present invention allows a user to transfer, at the withdrawal from a group, the right of management of video information to another member of the group.

BRIEF DESCRIPTION OF DRAWINGS

FIG. 4 is a diagram of group information showing groups to which users belong to.

FIG. 9 is a diagram showing an example of a user interface where a group from which the current user withdraws is selected.

FIG. 10 is a diagram showing an example of a user interface where the way in which the posted video information is to be managed at the withdrawal from the group is selected.

DESCRIPTION OF EMBODIMENTS

Underlying Knowledge Forming Basis of the Present Invention

In relation to the video management method employed by the moving image distribution services disclosed in the Background Art section, the present inventors have found the following problem.

Such a moving image distribution service provides a moving image with an advertisement. Before or in the middle of reproduction of the moving image, the advertisement superimposed on the moving image is reproduced. Then, clicking on the frame of the advertisement leads to a website of the sponsor of the advertisement. When sales owing to such moving-image viewing are made for the sponsor, it is common for the sponsor to pay a certain amount of revenue sharing to a moving image distributor. Therefore, generally speaking, administrative costs of the moving image distributor are covered by the advertising revenue and the revenue sharing.

Such a moving image distribution service generally uses a cloud-based moving image distribution server 11. Thus, a moving image distribution system 10 for implementing the moving image distribution service is configured with a combination of well-known IT component technologies. For simply providing the aforementioned typical moving image distribution service, no particular technology deserves special mention here. In other words, the aforementioned usage example can be technically implemented by a control application (program) included in the moving image distribution server 11.

Figure 1:
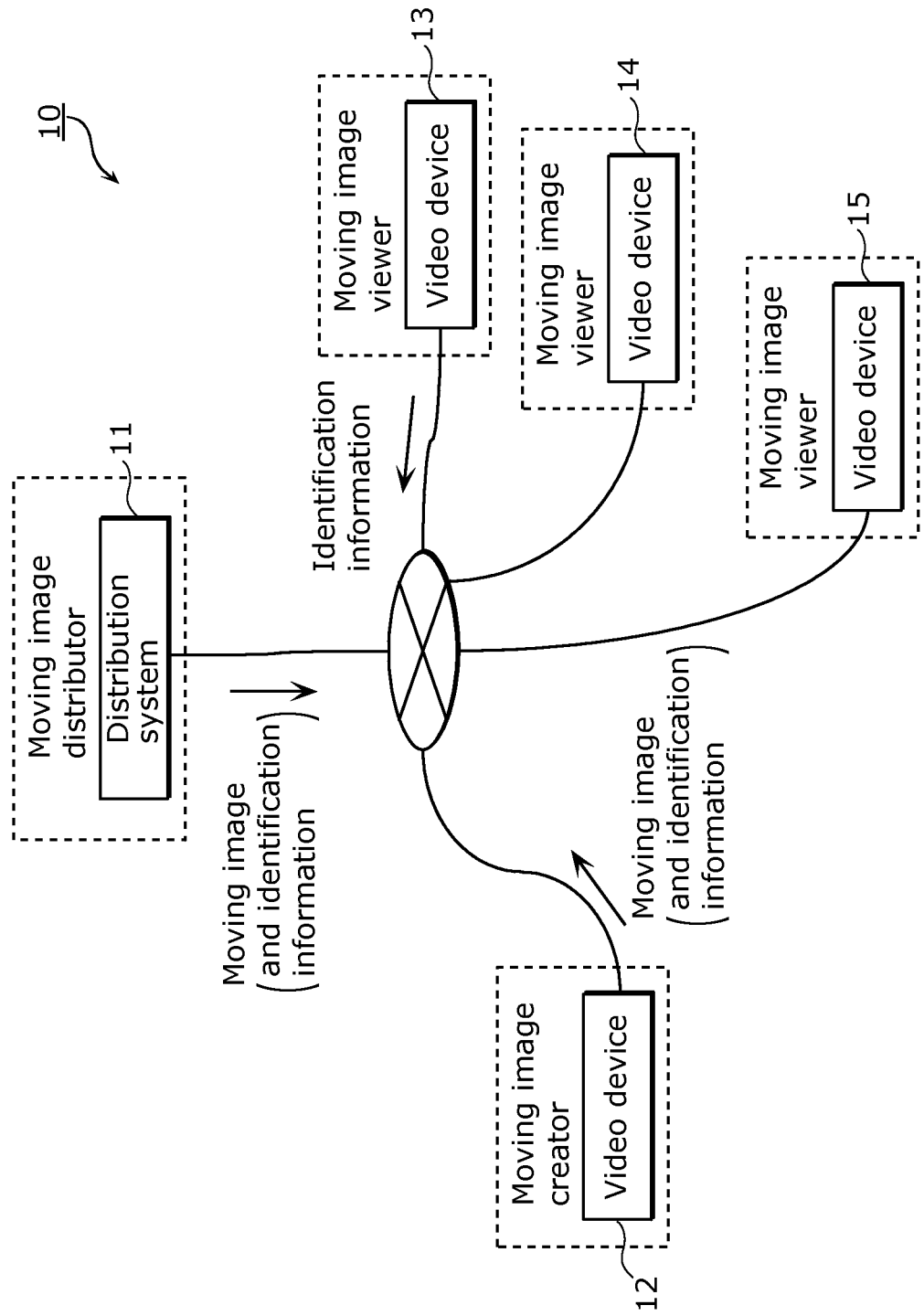
FIG. 1 is a diagram explaining a conventional moving image distribution system

FIG. 1 shows a general representation of an existing moving image distribution system 10 described above. The moving image distribution system 10 includes the moving image distribution server 11, a video device 12 capable of uploading a moving image, and video devices 13 to 15 with which moving images uploaded to and stored in the moving image distribution server 11 can be viewed.

The video device 12 owned by a moving image creator uploads a moving image created by the moving image creator together with a title and a keyword that identify this moving image, to the moving image distribution server 11 managed by a moving image distributor. Here, the title and keyword are uploaded in association with the moving image. The moving image distribution server 11 converts the uploaded moving image into a distribution format, and stores and manages the converted moving image. On the other hand, a moving image viewer connecting to this distribution system uses the video device 13 to find a desired moving image by performing a search based on specific identification information (such as a title or a keyword). In many cases, the moving image distribution system 10 distributes the corresponding moving image in a predetermined distribution format to the video device 13 operated by this moving image viewer, using a streaming format. In this way, the system described above allows the moving image viewer to easily search for a desired moving image and to view the moving image on an Internet browser at any time.

Allowing an unspecified number of people to view an uploaded moving image is the premise for the moving image distribution service as typified by YouTube (registered trademark). Therefore, no system is provided to allow only a specific group of people to view the moving image. Moreover, the method for accessing the moving image is limited since making a search based on the identification information such as the title or the keyword is the premise.

In the near future, a moving image distribution server using an HTTP operable at low cost, such as Adaptive Streaming over HTTP, may be used together with a high-efficiency video coding method such as HEVC/H.265 or VP8. Moreover, all kinds of video devices such as smartphones, tablet computers, personal computers, digital still cameras, and televisions may be connected to the Internet, and may include an HTML5 browser capable of handling these moving images collectively. With such assumptions, the moving image distribution services have the potential to bring about a revolution.

To be more specific, a moving or still image captured by an individual may be uploaded instantly to the moving image server via the Internet. Thus, the individual may not have to capture, store, edit, reproduce, and manage moving images related to the lifetime of the individual. The moving images may be appropriately managed within the server according to, for example, the video shooting date, the video shooting location, the event name, subject identification based on image analysis, or scene identification. Therefore, as long as this individual is a member of a group and thus has a specific right of access, the individual may be able to view a desired scene that can be selected using an interface with a higher degree of efficiency at any time, at any place, with any terminal. Such an era seems to be coming.

Moreover, video captured by another member of the group may be managed by the moving image distribution server in the same manner as the video captured by the aforementioned individual. With such a system, personal content items having been open only to the corresponding individual can be "shared" among all the members belonging to the group.

Thus, such a system significantly changes the conventional method of using and managing the personal content items created by the individuals, and enables services where information is shared and used by the members of the group in a more meaningful way. For example, videos of children captured on a school sports day by different video cameras owned by different parents belonging to the same group may be combined on the server. With such a usage, the parent can reproduce the highlight scenes of the child captured from different angles.

Suppose that a specific group is established and only the members belonging to this group are allowed to view and share moving images as described above. Here, due consideration has not been given to a system whereby the user who uploaded the moving images transfers, at the withdrawal from the group, the right of management of video information including the moving images to another member of the group.

In order to solve the stated problem, a video management method according to an aspect of the present invention is a video management method of managing video information which is uploaded to a server by a user belonging to a group including a virtual administrator and a plurality of users and which is viewable by at least one different user belonging to the group via the Internet using an information terminal, the video management method including: associating the video information to be uploaded to the server by the user with user information indicating the user; storing the video information uploaded via the Internet into a storage unit; authorizing the different user to view the video information stored in the storage unit, the different user belonging to the group to which the user indicated by the user information associated with the video information belongs; and causing the user to select one process to be executed, at withdrawal of the user from the group, on the video information that the different user belonging to the group is authorized to view, the process being selected from among (i) deleting the video information; (ii) associating the video information with user information indicating the at least one different user belonging to the group; and (iii) associating the video information with administrator information indicating the virtual administrator of the group.

With this, the process to be performed, at the withdrawal of the user from the group, on the video information having been uploaded by the user is selected in advance by the user from among: (i) deleting the video information; (ii) associating the video information with user information indicating at least one different user belonging to the group; and (iii) associating the video information with administrator information indicating the virtual administrator of the group. Therefore, one of the processes of "deleting the video information", "associating the video information with the user information", and "associating the video information with the administrator information" is performed after the withdrawal of the user from the group. This means that the video information remaining in the storage device is always associated with the information of a member currently belonging to the group. With this, the information indicating the member currently belonging to the group can be used for identifying who holds the right of management of the video information. To be more specific, the allowance to manage the video information is obtained before the withdrawal of the user from the group. With this, even after the withdrawal of the user from the group, the video information still available to a different user in the group can always have the holder of the right of management of this video information. On account of this, even when a user withdraws from a group, the group can take over the video information uploaded by this user. Thus, a different user belonging to this group can avoid a disadvantage where the shared video information cannot be viewed any more due to the withdrawal of the user.

For example, the video management method may further include executing, at the withdrawal of the user from the group, the process selected in the causing on the video information that the different user belonging to the group is authorized to view in the authorizing.

For example, the user information may include a user ID identifying the user and a password which are associated with each other, the video management method may further includes: receiving the user ID and the password entered by the user; and authenticating the user ID and the password received in the receiving, with reference to the user information stored in advance, and in a case where the user has not been authenticated in the authenticating for a predetermined period of time, the user may be considered in the executing to have withdrawn from the group to which the user belongs.

For example, the video management method may further include: determining, when the video information is accessed by a user, whether or not the accessing user matches one of the administrator and the user indicated by the information associated with the video information; and changing a mode to receive an instruction to edit the video information from the accessing user determined as matching one of the administrator and the user in the determining.

For example, when the user uploading the video information belongs to a plurality of groups, the video information may be further associated in the associating with the user ID and a group ID identifying a group selected by the user, and the different user belonging to the group identified by the group ID associated with the video information in the associating may be authorized to view the video information in the authorizing.

For example, the video management method may further include: notifying the different user authorized to view the video information in the authorizing that the different user is authorized to view the video information via the Internet; receiving, from the different user, a viewing request to view the video information regarding which the notification has been made; and distributing, to the different user, the video information requested through the viewing request received in the receiving.

For example, the video management method may further include identifying an individual captured in the video information, with reference to face information in which a face image and individual information indicating the individual are associated with each other, wherein information indicating the video information may be notified in the notifying to the different user authorized to view the video information in the authorizing, together with the individual information indicating the individual identified in the identifying.

For example, the video management method may further include: generating, from the video information, a digest video including at least a time slot where the individual identified in the identifying is captured; and receiving an entry to select the individual information notified in the notifying, wherein the digest video may be distributed in the distributing to the different user making the entry received in the receiving, the digest video showing the individual indicated by the individual information received in the receiving.

For example, the video information may be further associated in the associating with a location and a time where the video information is captured, and when a location and a time associated with first video information uploaded by a first user belonging to a first group among the groups are equal to a location and a time associated with second video information uploaded by a second user belonging to a second group different from the first group, the users belonging to the first group and the users belonging to the second group may be authorized in the authorizing to view the first video information and the second video information.

Moreover, a video management method according to an aspect of the present invention is a video management method of managing video information which is uploaded to a server by a user belonging to a group including a plurality of users and which is viewable by a different user belonging to the group via the Internet using an information terminal, the video management method including: associating the video information to be uploaded to the server by the user with user information indicating the user; storing the video information uploaded via the Internet into a storage unit; authorizing the different user to view the video information stored in the storage unit, the different user belonging to the group to which the user indicated by the user information associated with the video information belongs; notifying the different user authorized to view the video information in the authorizing that the different user is authorized to view the video information via the Internet; receiving, from the different user, a viewing request to view the video information regarding which the notification has been made; and distributing, to the different user, the video information requested through the viewing request received in the receiving.

For example, the video management method may further include identifying an individual captured in the video information, with reference to face information in which a face image and individual information indicating the individual are associated with each other, wherein information indicating the video information may be notified in the notifying to the different user authorized to view the video information in the authorizing, together with the individual information indicating the individual identified in the identifying.

For example, the video management method may further include: generating, from the video information, a digest video including at least a time slot where the individual identified in the identifying is captured; and receiving an entry to select the individual information notified in the notifying, wherein the digest video may be distributed in the distributing to the different user making the entry received in the receiving, the digest video showing the individual indicated by the individual information received in the receiving.

Furthermore, a video management system according to an aspect of the present invention is a video management system including an information transmitting terminal and a server which are connected to each other via the Internet, the information transmitting terminal uploading, to the server, video information created by a user belonging to a group including a virtual administrator and a plurality of users, the video management system further including an association unit which associates the video information to be uploaded to the server by the user with user information indicating the user, and the server including: a storage unit which stores the video information uploaded via the Internet; an authorization unit which authorizes at least one different user to view the video information stored in the storage unit, the different user belonging to the group to which the user indicated by the user information associated with the video information belongs; and a selection unit which causes the user to select one process to be executed, at withdrawal of the user from the group, on the video information that the different user belonging to the group is authorized to view, the process being selected from among (i) deleting the video information; (ii) associating the video information with user information indicating the at least one different user belonging to the group; and (iii) associating the video information with administrator information indicating the virtual administrator of the group.

Moreover, a video management system according to an aspect of the present invention is a video management system including an information transmitting terminal and a server which are connected to each other via the Internet, the information transmitting terminal uploading, to the server, video information created by a user belonging to a group including a plurality of users, the video management system further including an association unit which associates the video information to be uploaded to the server by the user with user information indicating the user, and the server including: a storage unit which stores the video information uploaded via the Internet; an authorization unit which authorizes a different user to view the video information stored in the storage unit, the different user belonging to the group to which the user indicated by the user information associated with the video information belongs; a notification unit which notifies the different user authorized to view the video information by the authorization unit that the different user is authorized to view the video information via the Internet; a request receiving unit which receives, from the different user, a viewing request to view the video information regarding which the notification has been made; and a distribution unit which distributes, to the different user, the video information requested through the viewing request received by the request receiving unit.

These general and specific aspects may be implemented using an integrated circuit, a computer program, or a computer-readable recording medium such as a CD-ROM, or any combination of integrated circuits, computer programs, or computer-readable recording media.

The following is a specific description of a video management method and a video management system in an aspect according to the present invention, with reference to the drawings.

Each of the exemplary embodiments described below shows a general or specific example. The numerical values, shapes, structural elements, the arrangement and connection of the structural elements, steps, the processing order of the steps etc. shown in the following exemplary embodiments are mere examples, and therefore do not limit the scope of the present invention. Therefore, among the structural elements in the following exemplary embodiments, structural elements not recited in any one of the independent claims indicating top concepts according to the present invention are described as arbitrary structural elements.

Embodiment

Figure 2:
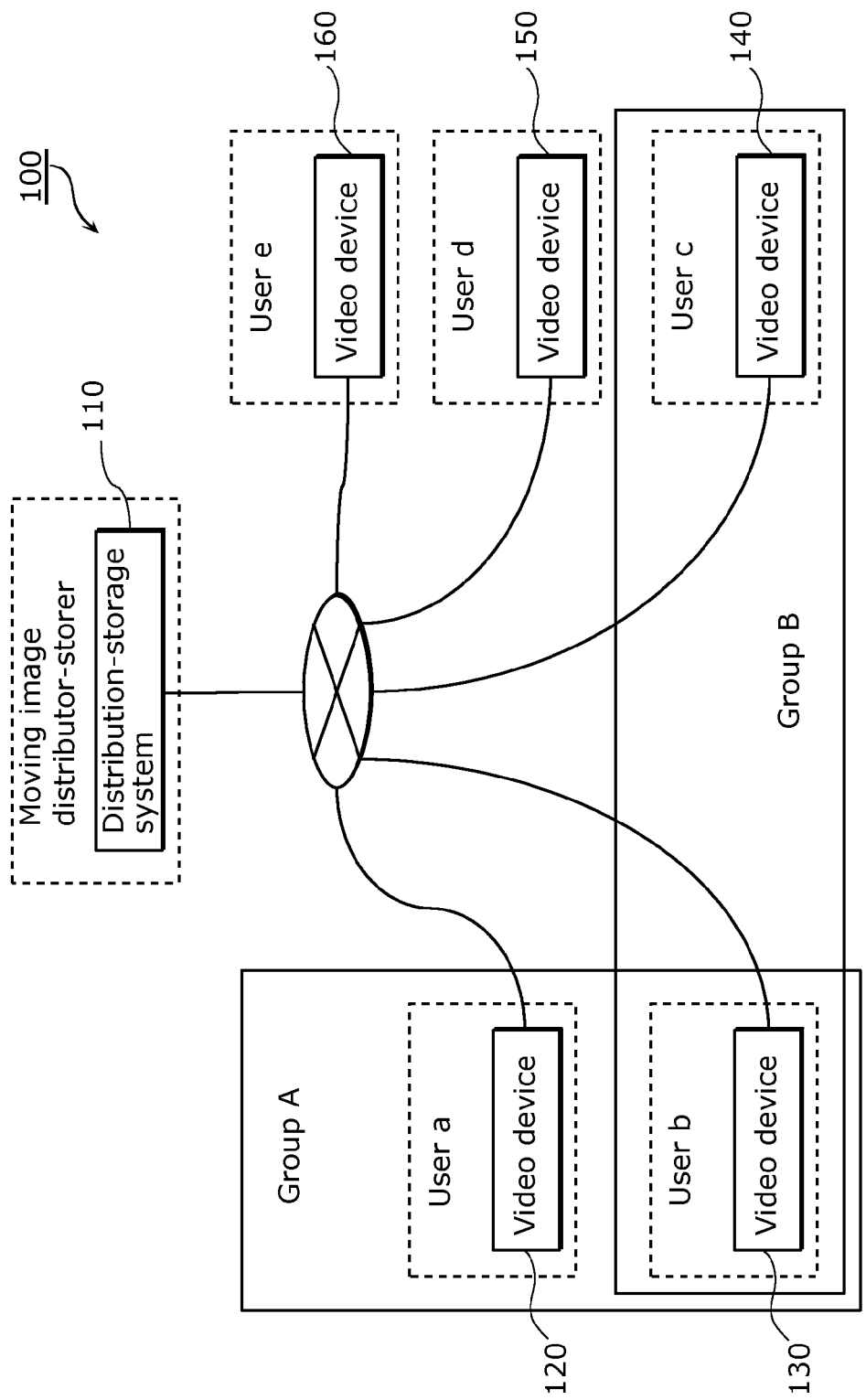
FIG. 2 is a diagram explaining a distribution-storage system according to the present invention.
Figure 3:
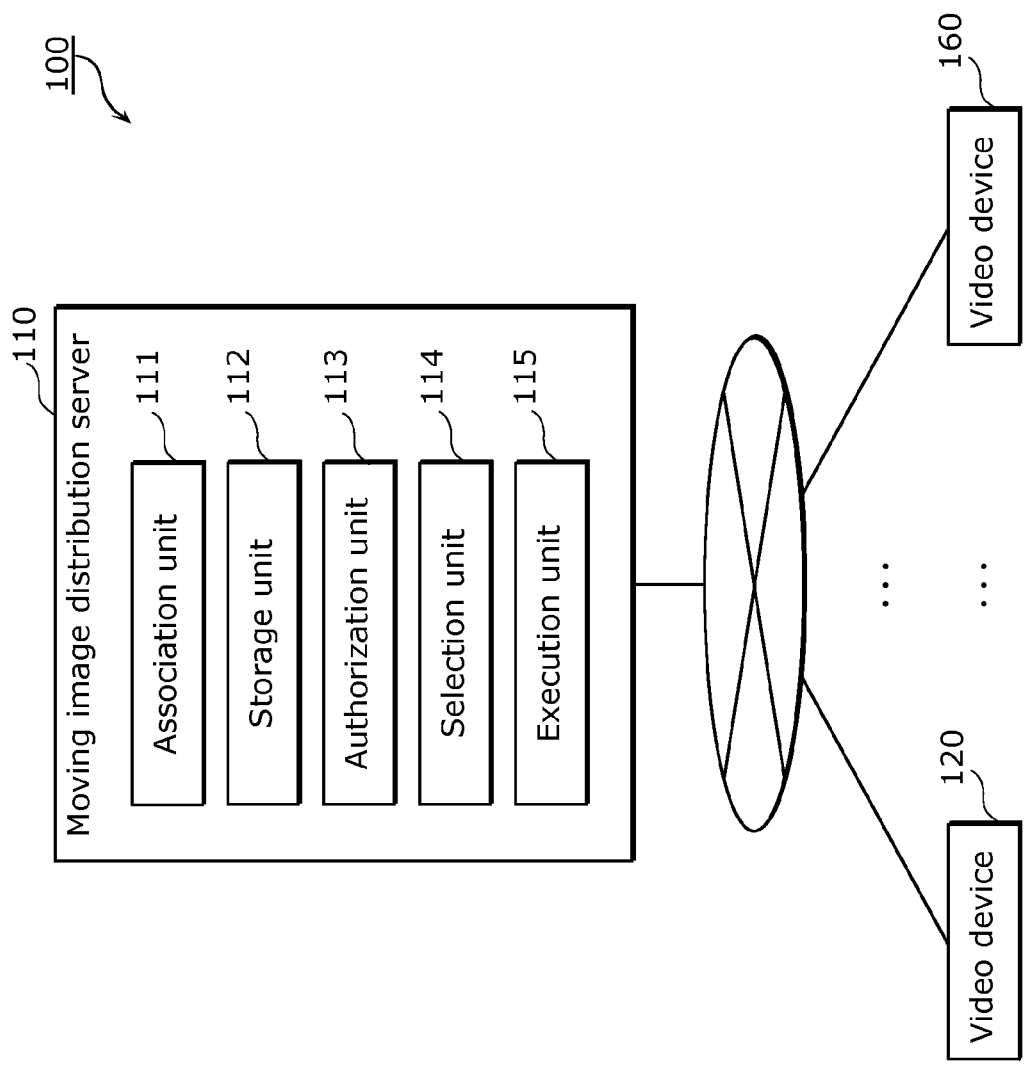
FIG. 3 is a diagram showing a specific configuration of a video management system.

FIG. 2 is a diagram showing grouping of video devices which are information terminals owned by users. FIG. 3 is a diagram showing a specific configuration of a video management system. FIG. 4 is a diagram of group information showing groups to which the users belong to.

As shown in FIG. 2, although a single moving image distribution server 110 is used as in a conventional case, a video management system 100 includes groups A and B into which users a to e are divided. Thus, the video management system 100 can make a setting separately for each of the groups, for viewing or usage of the uploaded video information (moving image).

For example, in the video management system 100, the users a and b belong to the group A and the users b and c belong to the group B. Thus, video information uploaded (hereafter, may also be referred to as "posted") by the user a or b and having a setting where only the users belonging to the group A can view or use this video information can be viewed or used only by the users belonging to the group A. Similarly, video information posted by the user b specifically for the users belonging to the group B can be viewed or used by the user c who belongs to the group B but cannot be viewed or used by the users a, d, and e who do not belong to the group B.

In this way, for each uploaded video, a group allowed to view or use the video can be set. Therefore, for example, when the children of the users a and b belong to the same soccer team, moving images of practices and games can be shared only among the members of the soccer team. At the same time, the videos of the children can be prevented from being viewed or used by a user who is not a member of this soccer team.

Figure 5:
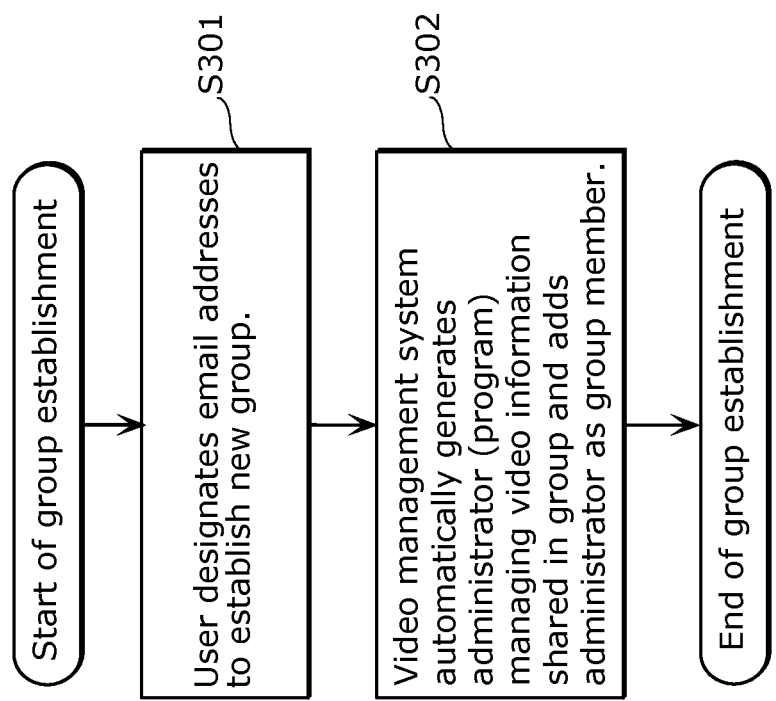
FIG. 5 is a flowchart for establishing a new group.

Such a grouping structure may be based on a structure of a mailing list which is a collection of emails, FIG. 5 is a diagram showing a flowchart for establishing a new group.

For example, the user a creates a mailing list A for the group A, and includes, into the mailing list A, those who are involved with the soccer team and wish to share the videos of this soccer team. To be more specific, the user a establishes a new group A by designating email addresses of those involved with the soccer team to create the mailing list A (S301). Following this, the video management system 100 automatically generates a virtual administrator (such as a program) managing the video information shared in the group A and adds the administrator as a member of the group A (S302).

Here, the group is set based on the mailing list. Thus, whenever the user posts a moving image, a message that a new moving image has been posted may be distributed to this mailing list.

Such group management using a mailing list has the following advantages for example: it is easy to establish or terminate a group; it is easy to perform user management (for adding a new user or removing an existing member from a group); and group management is implemented at low cost.

Group establishment is not limited to creation of a mailing list. More specifically, group establishment may be performed by generating group information in which a group ID identifying a newly established group and a user ID are associated with each other, as shown in FIG. 4.

Here, one or more video devices owned and used by the user are connected to the Internet. The video devices can access the video management system by designating, for example, the URL on a browser. To be more specific, the video devices may include a smartphone, a tablet computer, a personal computer, a television, and a digital camera that are used by the user. Having a unique account (including a user ID and a password), the user can access the video management system from any of the video devices and freely view the videos shared in the group to which the user belongs.

As shown in FIG. 2 and FIG. 3, the video management system 100 includes the moving image distribution server 110 and the video devices 120, 130, 140, 150, and 160. The video devices 120, 130, 140, 150, and 160 serve as information transmitting-receiving terminals.

The moving image distribution server 110 includes an association unit 111, a storage unit 112, an authorization unit 113, a selection unit 114, and an execution unit 115.

The association unit 111 associates video information to be uploaded by the user to the moving image distribution server 110 with user information indicating the user.

The storage unit 112 stores (accumulates) the video information uploaded via the Internet. To be more precise, the storage unit 112 is implemented by a volatile or nonvolatile memory, a hard disk drive (HDD), or the like.

The authorization unit 113 authorizes a different user to view the video information stored in the storage unit 112, the different user belonging to the group to which the user indicated by the user information associated with the video information belongs.

The selection unit 114 causes the user to select one of the following three processes that is to be performed at the withdrawal of the user from the group on the video information uploaded by the user and allowed to be viewed by the different user belonging to the group. The three processes are: (i) a process of deleting the video information; (ii) a process of associating the video information with user information of at least one different user belonging to the group; and (iii) a process of associating the video information with administrator information indicating the virtual administrator of the group.

The execution unit 115 executes the process selected in the selection unit 114 on the video information that the different user belonging to the group is authorized to view by the authorization unit 113.

It should be noted that each of the association unit 111, the authorization unit 113, the selection unit 114, and the execution unit 115 is a processing unit that is implemented through software with a program previously stored in the storage unit 112 and a processor. Note also that this is not intended to be limiting and that each of these processing units may be implemented through hardware with a dedicated processing circuit.

As shown in (a) of FIG. 4, the storage unit 112 may store group information in which a user ID as user information identifying a user and a group ID identifying a group to which the user belongs are associated with each other. Moreover, as shown in (b) of FIG. 4, the storage unit 112 may store management information in which video information uploaded to the moving image distribution server 110 is associated with the user ID of the user uploading the video information and with the group ID as the publication destination to which the video information is made public. It should be noted that the user identified by the user ID associated with the video information in the management information has the right of management of the current video information. To be more specific, the user identified by the user ID associated with the video information in the management information can, for example, delete, edit, or process the video information.

More specifically, for example, when the user enters the user ID and the password to log in to the video management system 100, authentication of the entered user ID and password is performed. When login is allowed as a result of the authentication, it is determined whether or not the user ID of the user authorized to log in matches the user ID associated in the management information. Then, the video information associated with the user ID of the user logging in is extracted with reference to the management information. Lastly, a receiving mode for the video information may be changed by displaying a graphical user interface (GUI). The GUI is capable of receiving instructions to delete, edit, or process the extracted video information, to change the publication destination of the extracted video information, or to make the extracted video information public or private. Here, information (such as a thumbnail image or a title) indicating the video information associated with the user ID and the video information not associated with the user ID may be displayed on the same screen. With this, when the information indicating the former video information is selected, the screen may be changed to receive the instructions to delete, edit, or process the video information, to change the publication destination of the video information, or to make the video information public or private. On the other hand, when the information indicating the latter video information is selected, the screen may be changed to receive an instruction for viewing this video information. in this way, when the user has the right of management of the video information uploaded to the moving image distribution server 110 of the video management system 100, the GUI where this video information can be edited is displayed. When the user does not have the right of management of the video information, the GUI where this video information can be simply viewed is displayed.

Figure 6:
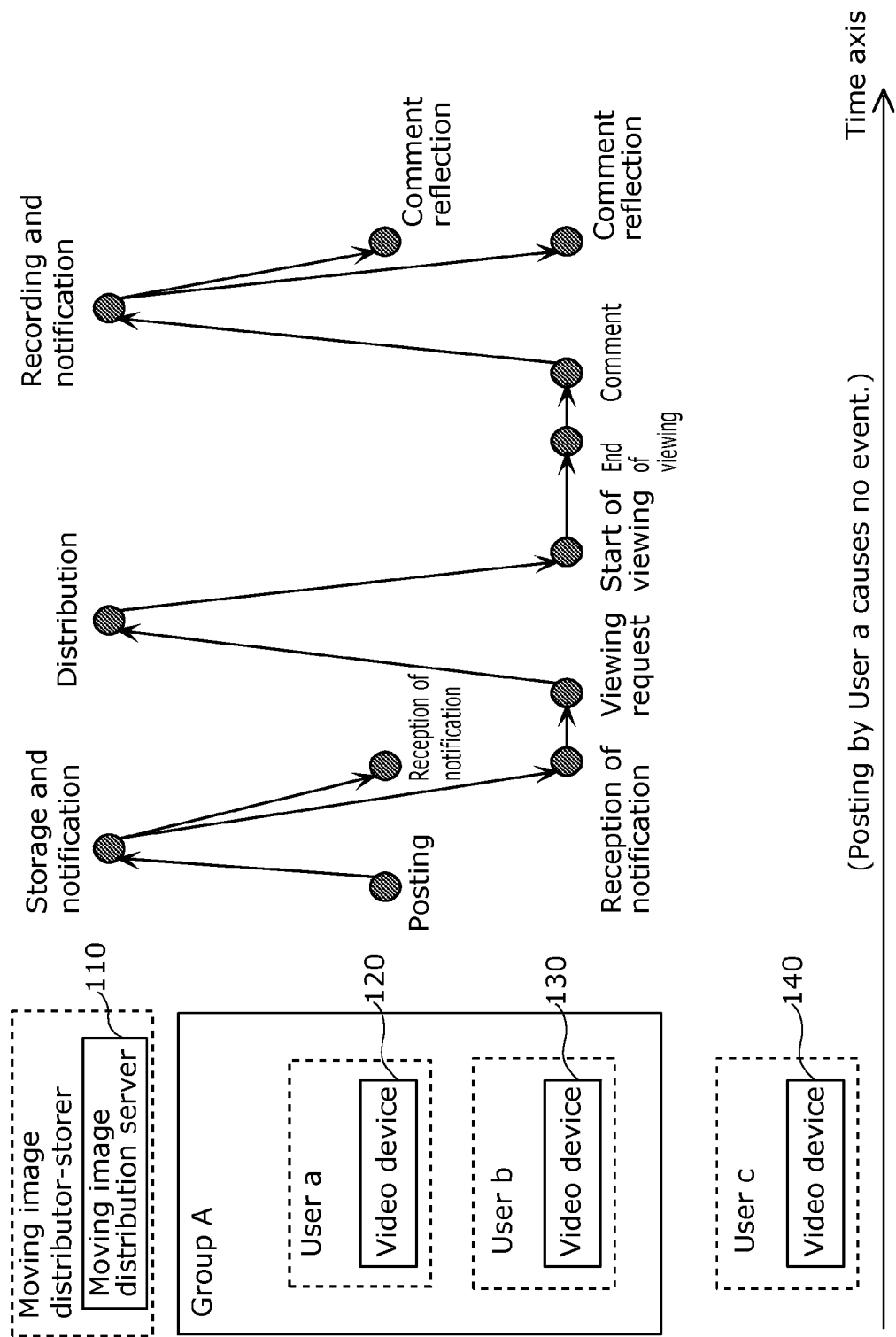
FIG. 6 is a flowchart explaining an operation performed by the distribution-storage system according to the present invention.

Next, a flow of processing performed by the video management system 100 when video information is posted is described, with reference to FIG. 6. In this diagram, the video management system 100, the video device 120 used by the user a, the video device 130 used by the user b, and the video device 140 used by the user c are arranged along the vertically axis. Here, the user a and the user b belong to the same group (the group A). Note that the horizontal axis is the time axis for explaining the system processing flow.

When the user a posts video information for the group A (i.e., when the user a sets the group A as the publication destination and uploads the video information), the video information is stored into the moving image distribution server 110 from the video device 120 used by the user a via a communication line such as the Internet. Here, the user a does not belong to any group other than the group A. On this account, in the case of a moving image uploaded by a user belonging to only one group in this way, the group to which the user belongs may be automatically set as the publication destination.

The posted video information is converted into an appropriate distribution format by the moving image distribution server 110 as necessary. In this case, the following information is associated with the video information as additional information of the moving image: the video shooting date, the video shooting location (GPS information), temperature/humidity at the time of video shooting, the photographer, and the poster. Moreover, the following processes are automatically performed, for example: identifying an individual captured in the video; and identifying a captured scene. Then, such additional information items are associated with the video information and are stored together with the video information into the storage unit 112 of the moving image distribution server 110.

To be more specific, the association unit 111 at least associates the video information to be uploaded to the moving image distribution server 110 by the user with the user information indicating the user. Moreover, when the user uploading the video information belongs to more than one group, the association unit 111 causes the user to select from among the groups to upload the video information and further associates the video information with the user ID and the group ID of the group selected by the user. Then, the storage unit 112 stores the video information uploaded via the Internet and associated with the additional information as described above.

When the processing, for example, for converting the video information into the distribution format is completed and distribution preparation is thus completed, the moving image distribution server 110 notifies all the video terminals used by the members belonging to the group A that new video information has been posted by the user a. More specifically, since each of the groups is set based on the mailing list as described above, this notification is transmitted to all the email addresses registered in the mailing list of the group A (i.e., the email addresses of the user a and the user b). Here, it should be obvious that the notification may be transmitted to the user, other than the posting user, belonging to the group A. To be more specific, the authorization unit 113 of the moving image distribution server 110 authorizes the different user, other than the posting user, belonging to the group identified by the group ID associated with the video information by the association unit 111 to view the video information stored in the storage unit 112. Then, the processing unit notifies the different user authorized to view the video information that the different user is authorized to view the video information via the Internet.

When the user b receives this notification and requests the moving image distribution sever 110 for viewing the posted video (i.e., makes a viewing request), the video information is distributed from the moving image distribution server 110 to the video device 130 transmitting the viewing request. More specifically, when receiving the viewing request from the user b to view the video information regarding which the notification has been made, the moving image distribution server 110 distributes the video information requested through the viewing request to the user b.

When viewing is finished, entry of a comment such as feedback may be received. Moreover, the storage unit 112 may further store the received comment as additional information of the video information, together with the user information indicating the user entering the comment. In this case, all the users belonging to the group A is notified that the comment on the video information has been entered.

In the meantime, since the video information posted by the user a is set to be public only to the group A, no notification is transmitted to the user c, the user d, and the user e (as well as to the video devices 140, 150, and 160 owned by the user c, the user d, and the user e, respectively). In other words, the user c, the user d, and the use e cannot view this video information. More specifically, with the above configuration, the users are divided into the groups. Therefore, when the video information is to be uploaded, the group may be selected and specified as the publication destination of the video information. As a result, the video information is made public only to the users of the specified group. Thus, the user can make the video information public only to the specific users, and thus can share the video information with the other users while protecting the privacy.

The notification is transmitted by email to the predetermined email addresses of the members of the group in which the moving images are shared. However, this is not intended to be limiting. For example, the notification may be made on "My Page" screen displayed on the device authorized when the user enters the user ID and the password into the video management system 100. In this case, the method of making the notification is not limited to transmission by email as long as the message that a new moving image has been added can be notified. An indication of addition (for example, an indication of "New") together with a thumbnail of the moving image may be displayed with the moving images that are already shared. In this way, it is preferable that the user be able to log in to the video management system 100 by entering the preset user ID and password.

Figure 7:
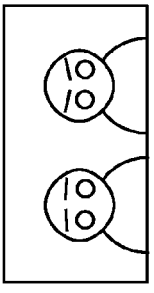
FIG. 7 is a diagram showing an example of a user interface in the case where a moving image is to be posted.

FIG. 7 is a diagram showing an example of a selection screen (a graphical user interface (GUI)) that is displayed for selecting a posting destination when a moving image is to be posted. For example, such a GUI is displayed on a smartphone when a moving image captured using the smartphone is to be posted. More specifically, such a GUI is displayed on the video devices 120, 130, 140, 150, and 160 used by the users a to e, respectively.

In the present example, information (including the thumbnail, the video shooting date, and the reproduction duration) identifying the moving image to be posted is displayed. Moreover, the groups to which the user posting the moving image belongs are displayed in list form.

This user belongs to three groups which are: a group called "Only family members" including only the family members of this user; a group called "Imafuku Kindergarten" including those involved with the kindergarten that the child of this user attends; and a group called "Imafuku Little League Soccer Club" including those involved with the soccer club that the child of this user belongs to. The user selects from among the three groups by placing a checkmark in the checkbox displayed on the left side of the group name. By doing so, the user can select the group which the displayed moving image (i.e., the moving image to be posted) is to be published to and to be shared in.

When the moving image is to be released to the general public regardless of the groups, the user may place a checkmark only in the bottom checkbox. With this, the moving image is made public to an unspecified number of users. Here, each of numbers in parentheses beside the group names indicates the number of users registered in the corresponding group.

In the case shown in FIG. 7, the presented moving image is made public only to the two groups of "Only family members" and "Imafuku Kindergarten". Information about the publication destinations of this moving image is transmitted together with the moving image from, for example, an HTML5 browser of the smartphone to the moving image distribution server 110. Then, the information is recorded, managed, or used in the moving image distribution server 110. To be more specific, when the user uploading the video information belongs to more than one group, the video information is stored into the storage unit 112 in association with the user ID and the group ID identifying the group selected by the user.

Figure 8:
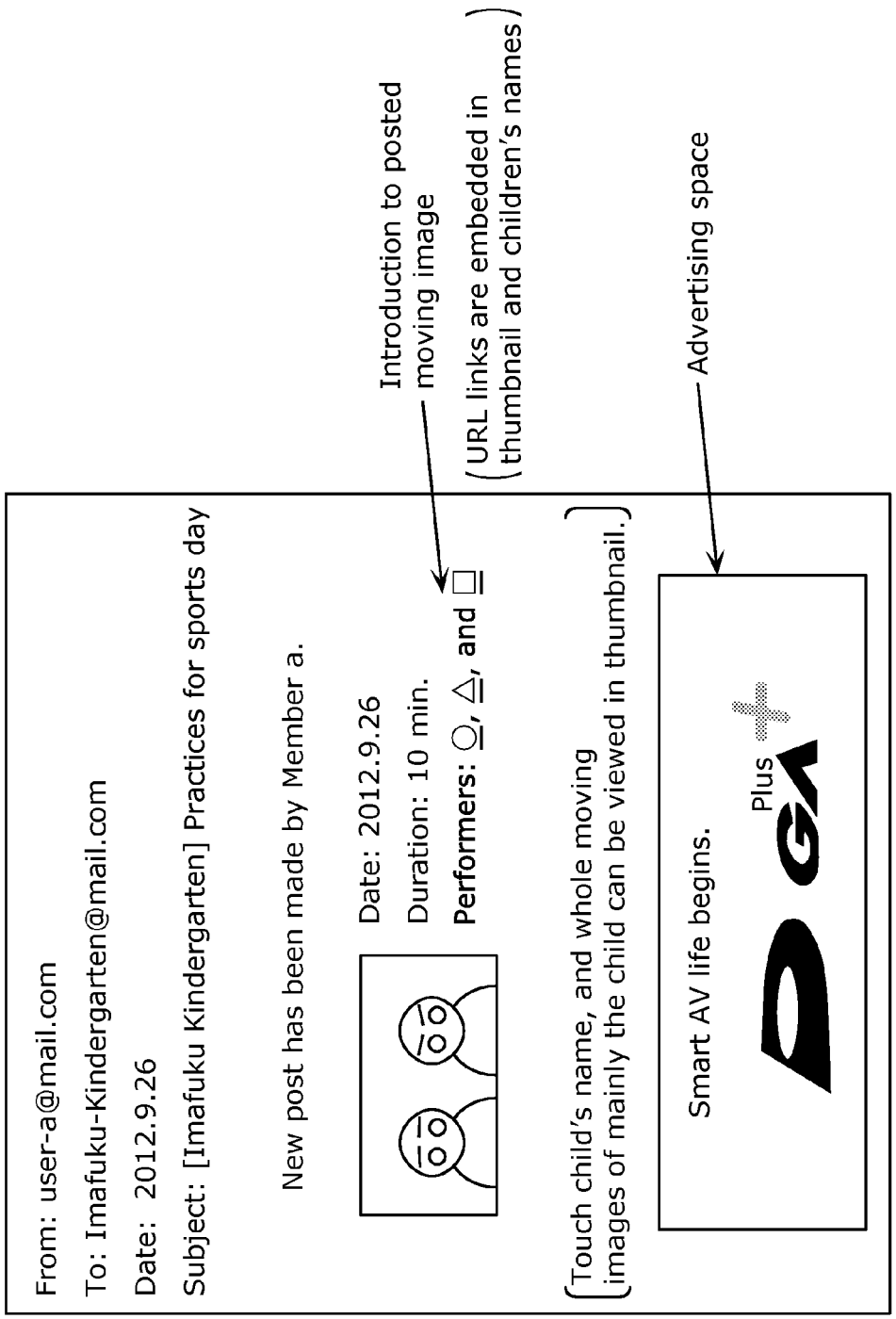
FIG. 8 is a diagram showing an example of an email notifying that a moving image has been posted.

FIG. 8 is a diagram showing an example of an email screen that notifies the members of the group about the video information posted as described above.

In the case where the groups are divided according to the mailing lists as described above, such a notification can be easily implemented by transmitting the email from the moving image distribution server 110 to the mailing list of the group specified as the publication destination.

It can be seen from the present diagram that the user a has made a new post and that an email including information of the posted moving image and the advertising space of a sponsor of this service is transmitted to the mailing list of the group called "Imafuku Kindergarten" (Imafuku-Kindergarten@mail.com). Here, the information of the posted moving image includes the thumbnail of the moving image, the shooting date, the reproduction duration, and the names of captured subjects individually identified by face recognition.

When the user belonging to the group called "Imafuku Kindergarten" and receiving this email touches or clicks the thumbnail, viewing of the whole moving image starts immediately. Moreover, when the identified individual name is selected by being touched or clicked, scenes included in the moving image and having mainly this individual identified by face recognition can be viewed like a digest version.

More specifically, the individual captured in the video information (the moving image) is identified with reference to face information in which a face image and individual information indicating the individual are associated with each other. Moreover, a digest video including at least a time slot where the identified individual is captured in the video information is generated. Such identification of the individual and generation of the digest video are performed when the moving image is posted to the moving image distribution server 110. Then, together with the name of the individual as the individual information indicating the identified individual, information indicating the video information is notified by email to the different user authorized by the authorization unit 113 to view the video information. Following this, the moving image distribution server 110 receives an entry to select the individual name notified by email, and distributes the digest video in which the individual identified by the received individual name is captured to the user making the aforementioned entry.

The above operations can be implemented by describing the notification email using HTML. Thus, link information for distributing the whole moving image is embedded in the thumbnail of the moving image in this email, and link information for distributing the digest video is embedded for each of individual names in the email. With this technique, the user can view mainly the scenes of the child, out of the moving images captured by the different user. Such a method is extremely important in increasing the convenience of a personal content sharing system according to the present invention.

Here, an advertising space is provided at the end of this email. In the case of an HTML email, it is possible to display an advertisement as shown in FIG. 8 when the user reads the email. This can be implemented through selection and obtainment of an advertisement, as needed, that is worth showing to the user to whom the moving image distribution server 110 transmits the notification.

An advertisement that is highly valuable to both the sponsor and the user receiving the email (i.e., an advertisement easily leading to a business deal) can be displayed in this email. Therefore, the moving image distributor providing the moving image distribution service can also receive advertising revenue from the sponsor, and thus can be a business model for setting up a new video distribution business.

FIG. 9 is a diagram showing an example of an interactive screen (GUI) used when the user belonging to the group withdraws from the group.

When the user withdraws from the group, all the groups to which the current user belongs are displayed. Then, the user selects a group from which the user is to withdraw. This diagram shows that the user a selects the group called "Imafuku Little League Soccer Club" as the group from which the user is to withdraw.

Figure 11:
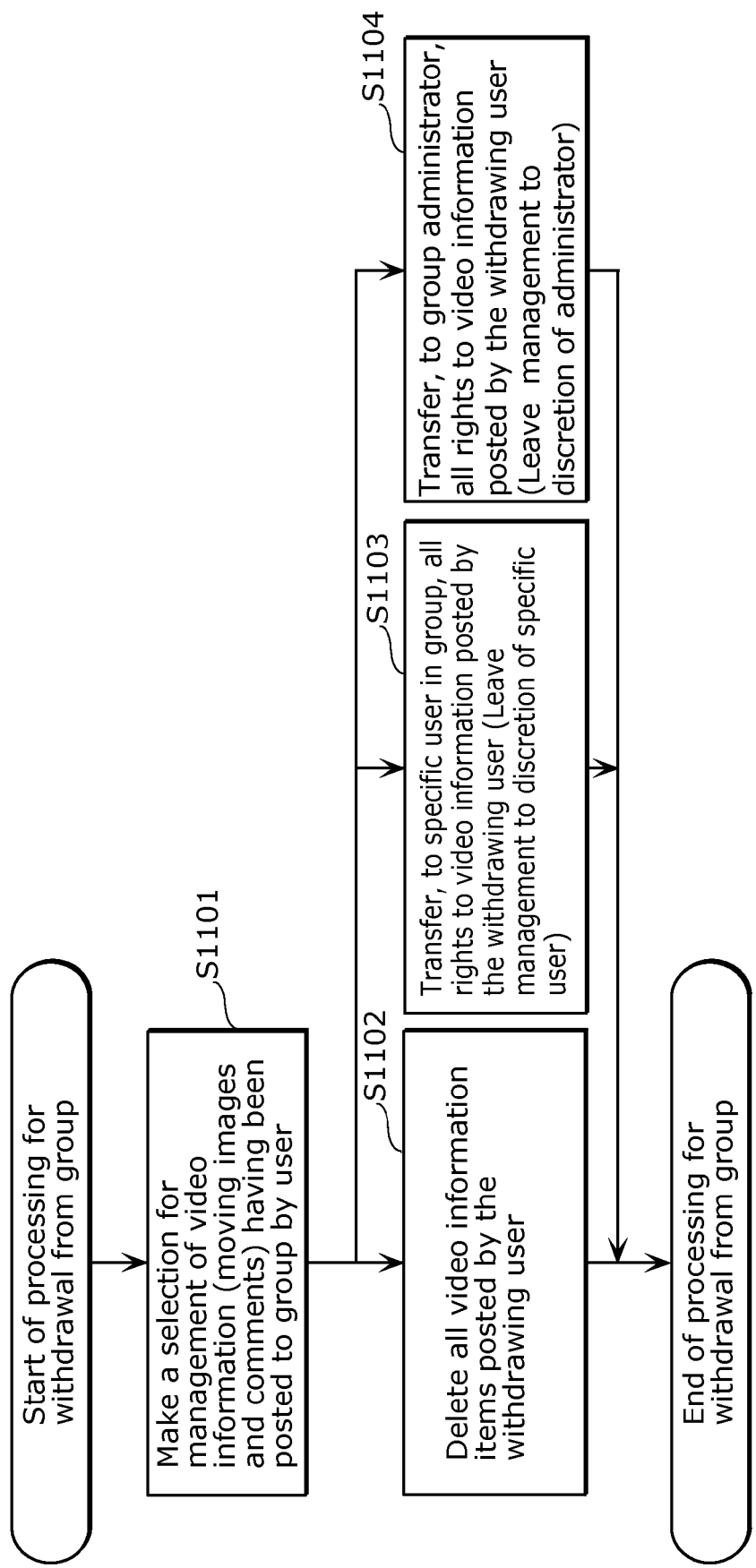
FIG. 11 is a flowchart for withdrawal from a group.

FIG. 10 is a diagram showing an example of a selection screen for selecting the way of management of the video information having been posted to "Imafuku Little League Soccer Club" by the user a (such as the moving and still images posted by the user a and/or the comments made by the user a on the video information shared in this group). FIG. 11 is a flowchart for withdrawal from the group.

When withdrawing from a group, the user can select from among the following options to manage the video and comments having made public to the group: (i) delete all; (ii) transfer all rights to a member (for example, a reliable member) in the group; or (iii) transfer all rights to the administrator of the group. To be more specific, when the user withdraws from the group, the selection unit 114 of the moving image distribution server 110 causes the user to select one from among at least the following three processes that is to be performed at the withdrawal of from the group on the video information that has been uploaded by the user and that the different user in the same group is authorized to view (S1101). The three processes are: "process of deleting the video information"; "process of associating the video information with the user information of at least one different user in the group"; and "process of associating the video information with the administrator information indicating the virtual administrator of the group".

When the "process of deleting the video information" is selected in Step S1101, this process is performed (S1102). When the "process of associating the video information with the user information of at least one different user in the group" is selected in Step S1101, this process is performed (S1103). When the "process of associating the video information with the administrator information indicating the virtual administrator of the group" is selected in Step S1101, this process is performed (S1104). More specifically, at the withdrawal of the user from the group, the process selected in Step S1101 is performed on the video information that the different user in the group is authorized to view by the authorization unit 113.

The processes for the user to select from at the withdrawal from the group in Step S1101 are not limited to the three processes described above. For example, the processes may include a "process of deciding by majority vote of the members in the group". Note that Step S1101 does not need to be performed when the user withdraws from the group. For example, Step S1101 may be performed in advance when the user joins the group. Here, it is advantageous to perform Step S1101 in advance, for the case where the user is considered to have withdrawn from the group as described later.

It should be noted that the administrator of the group refers to the moving image distributor that holds and manages content items (the video information items) of the group called "Imafuku Little League Soccer Club". To be more specific, the administrator of the group refers to a holder/administrator (that may be a computer program in reality) that continues, on behalf of the withdrawing member, to hold and manage the property (video information) that is shared in the group and should be taken over, at the withdrawal of the member from this specific group.

To be brief, when "Delegate to administrator of group" is selected in FIG. 10 and FIG. 11, the video information posted by the withdrawing user (the copyrights of the posted moving images and comments) is completely transferred to the administrator (namely, the moving image distributor) and managed hereafter by the administrator at the discretion of the administrator.

Such a selection for managing the video information at the withdrawal from the group should be made not to damage the interests of the other members remaining in the group. It may well be that the user b views desired moving images (such as highlight scenes of the child of the user b on the school sports day) using partially both the moving images posted by the user a and the moving images posted by the user b. However, when the moving images having been posted by the user a are deleted at the withdrawal of the user a from the group, the user b cannot view these moving images any more.

However, the moving images posted by the user a include a larger number of scenes where the child of the user a is captured in close-up. Therefore, practically speaking, in terms of the right of publicity and privacy, it may be difficult for the user a to transfer all the rights to the user b at the withdrawal from the group A.

On account of this, when the group includes the administrator that is not a subscriber of the service and that thus has a neutral position as described, the user a allows the group A to take over the moving images without transferring all the rights of the moving images to the user b. Therefore, the chance that the members of the group A may lose the shared moving images is reduced. Moreover, the members of the group A can avoid legal risk related to the management of the moving images captured by the member who has already withdrawn from the group.

Figure 12:
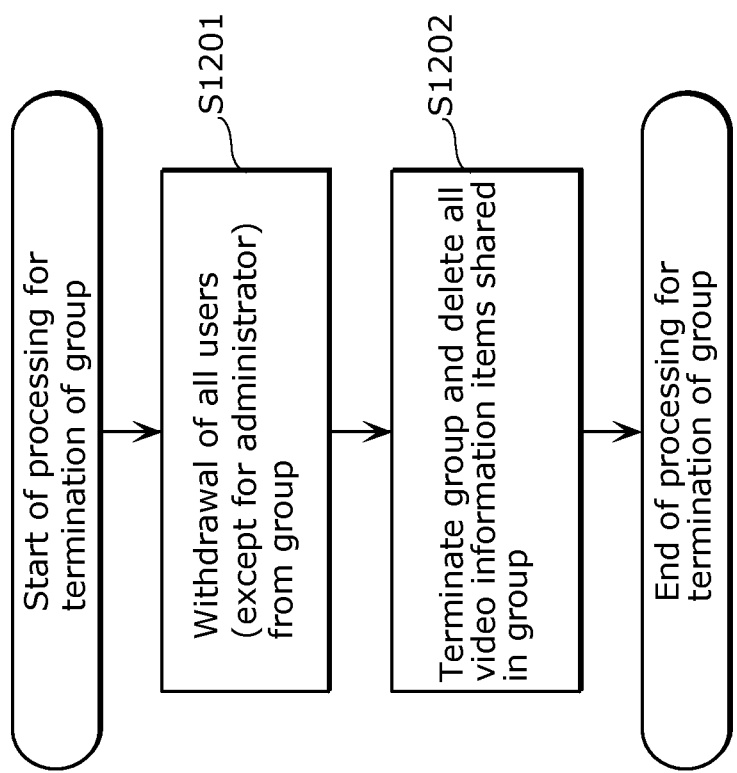
FIG. 12 is a flowchart for termination of a group.

FIG. 12 is a flowchart for termination of a group.

Group termination is implemented according to a determination as to whether all the users belonging to the group except for the administrator withdraw from the group (S1201). When it is determined that all the users withdraw from the group (S1201: Yes), this group is terminated. Then, all the video information items shared in the group are deleted (S1202). For example, Step S1201 may be performed whenever a member withdraws from the group. In the case where it is not determined in Step S1201 that all the users withdraw from the group, Step S1201 is to be performed again next time a member withdraws from the group.

The video management method and the video management system 100 according to Embodiment cause the user to select, in advance of the processing for withdrawal, one of the following processes: the "process of deleting the video information"; the "process of associating the video information with the user information of at least one different user in the group"; and the "process of associating the video information with the administrator information indicating the administrator of the group". The selected process is performed after the withdrawal of the user from the group on the video information having been uploaded by the withdrawing user.

Therefore, one of the processes of "deleting the video information", "associating the video information with the user information", and "associating the video information with the administrator information" is performed after the withdrawal of the user from the group. This means that the video information remaining in the storage device is always associated with the information of a member currently belonging to the group. With this, the information indicating the member currently belonging to the group can be used for identifying who holds the right of management of the video information. To be more specific, the allowance to manage the video information is obtained before the withdrawal of the user from the group. With this, even after the withdrawal of the user from the group, the video information still available to a different user in the group can always have the holder of the right of management of this video information. On account of this, even when a user withdraws from a group, the group can take over the video information uploaded by this user. Thus, a different user belonging to this group can avoid a disadvantage where the shared video information cannot be viewed any more due to the withdrawal of the user.

Alternative Embodiment

The above has described the case of selecting the method for managing the video information at the withdrawal of the user from the group. However, the management method can be similarly applied to the cases such as where the user a is deceased and where the service is cancelled because the service charge remains unpaid. Here, possible future problems in such cases can be avoided by previously making a setting in the initial clauses at the service subscription. For example, according to the setting made for such cases, the video information posted by the user (the copyrights of the posted moving images and comments) is automatically transferred to the administrator. For instance, the decease of the user a may be automatically determined in the case where the user a has not logged in to the moving image distribution server 110 for a predetermined period of time (such as three years). More specifically, when it is determined with reference to the previously-stored user information that authentication of the entered user ID and password has not been performed for this user for a predetermined period of time, this user may be considered to have withdrawn from the group.

In the present embodiment, the option "Delete all" is separately provided for the moving images and for the comments. Here, the scenes determined not to include the child of the current user so much on the basis of face recognition may be left as the shared assets (shared copyrighted items) of the group instead of being deleted. Moreover, in such a case, another option such as "Delete family scenes mainly and delegate other scenes to administrator" may be provided. With this, the moving image distribution server 110 may perform a process of deleting only scenes where the corresponding family members are identified by face recognition.

Even in the case of deleting the family scenes mainly, it may be possible that the current video is extremely valuable for a different user in the group. Thus, another option "Delegate to administrator after performing mosaic processing only on family member images" may be provided. In this case, it may be determined later that the mosaic processing is unnecessary. For this reason, it is preferable that the original information of the video information be stored first before the mosaic processing is performed on this video information. More specifically, it is preferable to separately generate the mosaic-processed video information and then share this mosaic-processed video information in the group. With this, when the user determines later that the mosaic processing is unnecessary, the original video before the mosaic processing is performed can be shared again in the group.

The above describes the case where the moving image distribution server 110 automatically creates the video the user wishes to view by processing or editing the moving image posted by the user in the group. However, the user may superimpose the posted comment on the moving image. For example, a text message saying, for instance, "Nice goal, oo!" may be superimposed on the video information where the child makes a goal in a little league soccer game. In this case, the text message saying "Nice goal, oo!" may be superimposed and displayed on the scene where the child oo makes a goal, out of the scenes included in the video information. The above describes the case where the additional information of the moving image includes the video shooting date, the video shooting location, and the scene identification. However, using these information items, a telop explaining the video such as "oo Club vs. ∆∆ Club" may be added at the beginning of the moving image reproduction, based on the date, the location, and the scene identification. With this, the video information made easier to understand can be presented.

Here, legal issues related to copyright and right of publicity may arise because personal content items are managed. In order to prevent an unauthorized copy of video from being distributed to others and protect the privacy, viewing through the video management system 100 should be implemented only by streaming instead of downloading. Moreover, in order to prevent inappropriate secondary use of the personal content items regarded as the shared assets (shared copyrighted items) of the group, the video information may not be returned to the user posting this video information or may be returned to the user only under a reasonable condition, at the cancellation of this service.

Depending on a video camera, a digital still camera, or a smartphone, control may be performed in order for a captured video to be automatically uploaded to the video management system 100. In other words, the captured video is always uploaded to a cloud where the uploaded videos are collectively managed. This has the advantage of saving the user the bother of managing the content items. Moreover, by charging for the use of such a management application having the aforementioned advantage, video cameras, digital still cameras, and smartphones may be nearly free of charge.

It is preferable for groups to have a system allowing the groups to share part of video information items held by the groups (only video information items determined as having the same shooting date and location). For example, suppose that a group A established by those involved with a soccer club A and a group B established by those involved with a soccer club B are present at a soccer game. When the soccer club A and the soccer club B have a game, it is beneficial for both the group A and the group B to manage only the videos of this game as the shared assets (shared copyrighted items) of the groups A and B, instead of exclusively managing within each of the groups. More specifically, when first video information uploaded by a first user belonging to a first group (the group A) among the groups is equal in location and time to second video information uploaded by a second user belonging to a second group (the group B) different from the first group (the group A), the authorization unit 113 authorizes the users belonging the first group (the group A) and the users belonging to the second group (the group B) to view the first video information and the second video information. Thus, for example, since each of the groups is set based on the mailing list as described above, the notification as described above is transmitted to the users belonging to the groups A and B.

Figure 13:
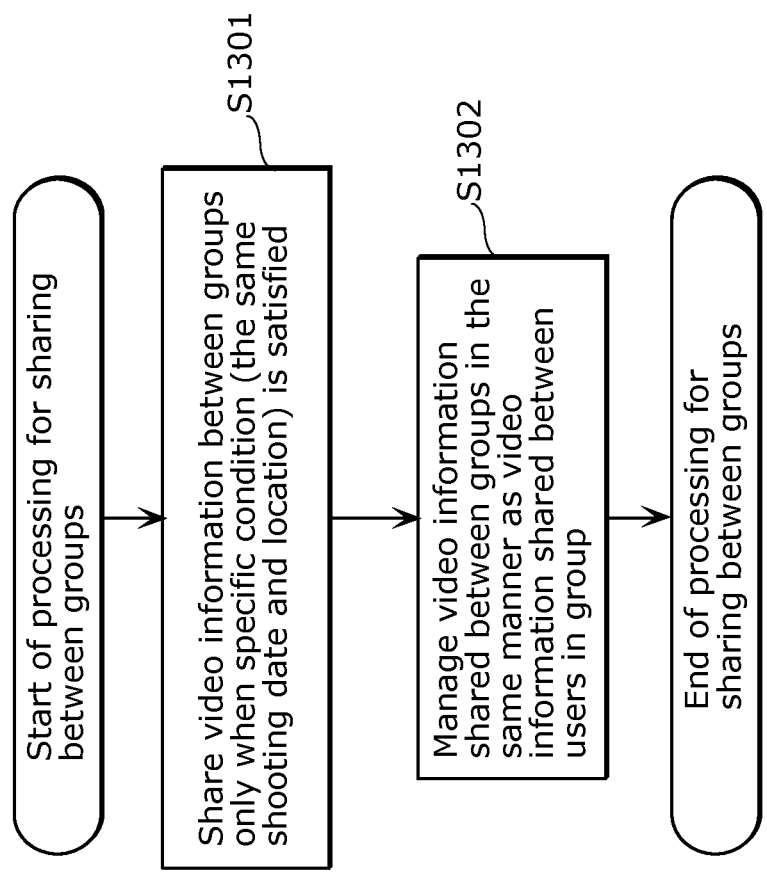
FIG. 13 is a flowchart for sharing between groups.

To be more specific, the video information is shared between the groups as shown in FIG. 13 for example. FIG. 13 is a flowchart for sharing the video information between the groups.

Firstly, it is determined whether or not video information items having the same shooting date and location (as the specific condition) have been uploaded by the different groups (S1301). When it is determined that the video information items having the same specific condition have been uploaded (S1301: Yes), the groups as publication destinations of the video information items having the same specific condition are regarded as one group and the video information items are shared as described above (S1302).

Thus, in the case of sharing between the groups, the condition (such as the video shooting date and location) of video information items to be shared between the groups may be set. Then, only the video information items held by the groups A and B that satisfy the above condition may be shared between these groups. Management of such shared assets (shared copyrighted items) may be the same as the management in the case of the withdrawal of a user from the group (FIG. 9). Alternatively, the following may be set in advance: when one of the groups is terminated, management may be left to discretion of the administrator of the other group.

Figure 14:
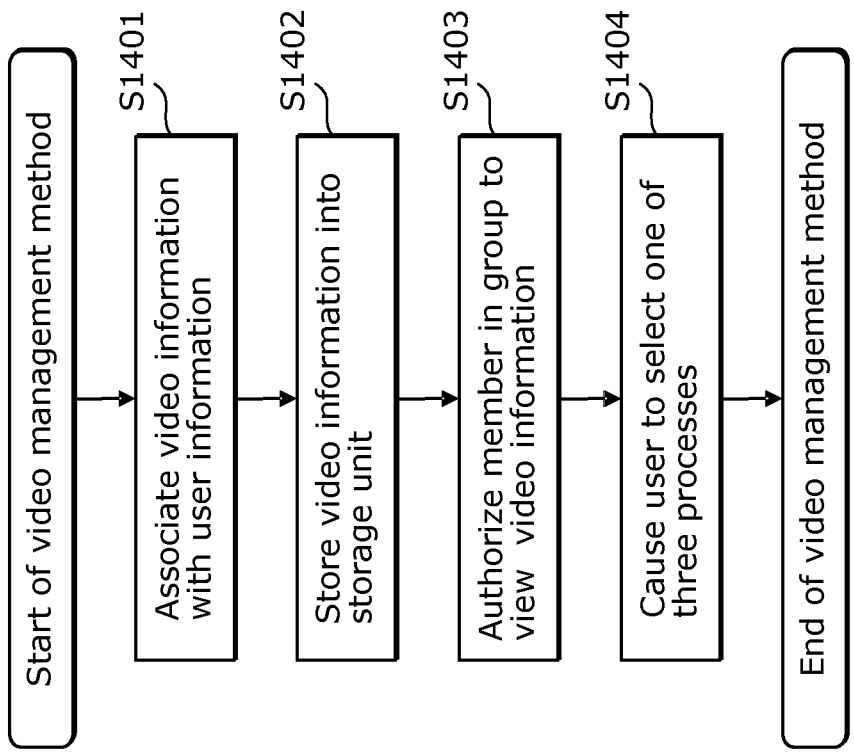
FIG. 14 is a flowchart of a video management method according to another embodiment.

The video management method according to the present invention may include at least steps of the flowchart shown in FIG. 14.

More specifically, video information to be uploaded by a user to the moving image distribution server is associated with user information indicating the user (S1401: Step of associating).

Next, the video information uploaded via the Internet is stored into the storage unit 112 (S1402: Step of storing).

Next, a different user is authorized to view the video information stored in the storage unit 112, the different user belonging to the group to which the user indicated by the user information associated with the video information belongs (S1403: Step of authorizing).

Next, the user is caused to select one process to be executed, at withdrawal of the user from the group, on the video information that the different user belonging to the group is authorized to view, the process being selected from among (i) deleting the video information; (ii) associating the video information with user information indicating at least one different user belonging to the group; and (iii) associating the video information with administrator information indicating the virtual administrator of the group (S1404: Step of causing).

Figure 15:
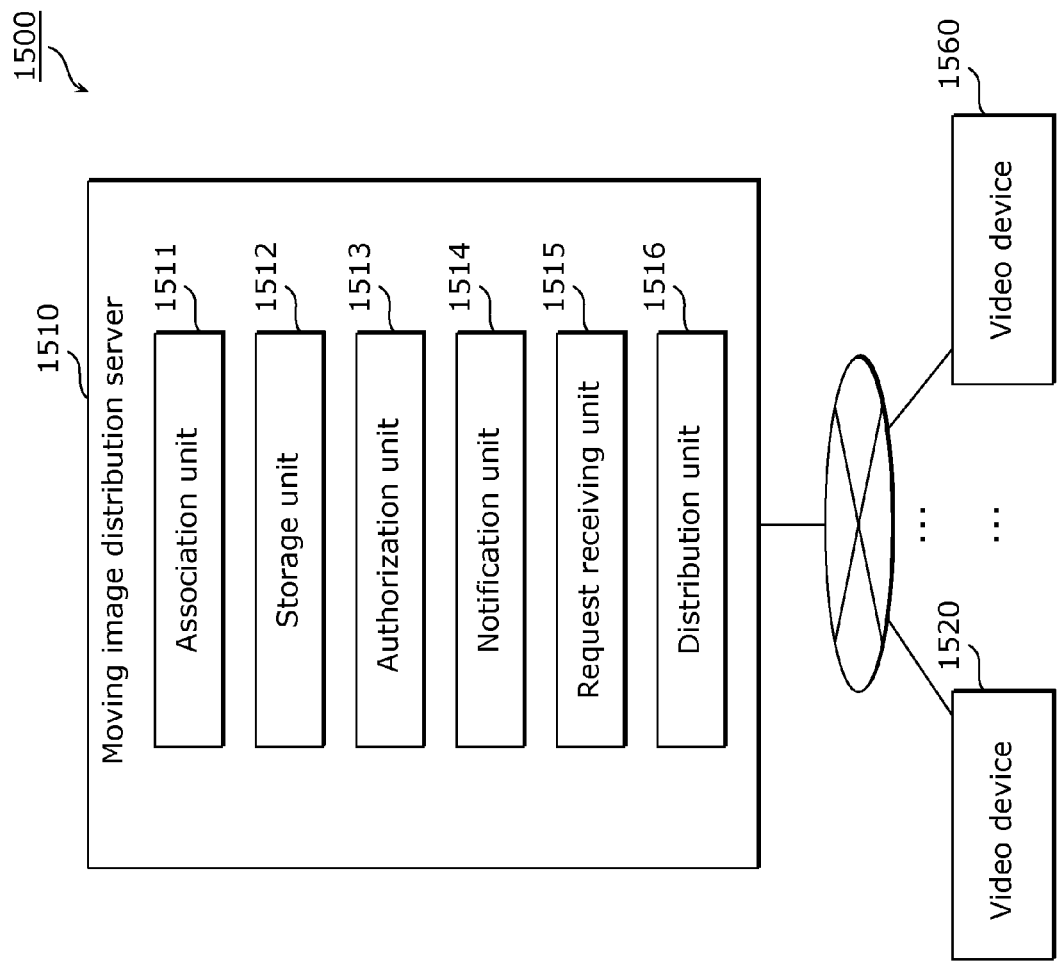
FIG. 15 is a diagram showing a configuration of a video management system according to another embodiment.

Furthermore, the video management system according to the present invention may include at least blocks of the block diagram shown in FIG. 15.

More specifically, a video management system 1500 includes video devices 1520 to 1560 and a moving image distribution server 1510. Information transmitting terminals of the video devices 1520 to 1560 upload, to the moving image distribution server 1510, video information created by users belonging to a group that includes a plurality of users. The video management system 1500 further includes an association unit 1511 that associates video information to be uploaded by a user to the moving image distribution server 1510 with user information indicating the user. Moreover, the moving image distribution server 1510 includes a storage unit 1512, an authorization unit 1513, a notification unit 1514, a request receiving unit 1515, and a distribution unit 1516. The storage unit 1512 stores the video information uploaded via the Internet. The authorization unit 1513 authorizes a different user to view the video information stored in the storage unit 1512, the different user belonging to the group to which the user indicated by the user information associated with the video information belongs. The notification unit 1514 notifies the different user authorized to view the video information by the authorization unit 1513 that the different user is authorized to view the video information via the Internet. The request receiving unit 1515 receives, from the different user, a viewing request to view the video information regarding which the notification has been made. The distribution unit 1516 distributes, to the different user, the video information requested through the viewing request received by the request receiving unit 1515. It should be noted here that the storage unit 1512 and the authorization unit 1513 correspond, respectively, to the storage unit 112 and the authorization unit 113 of the moving image distribution server 110 described in the above embodiment. Note also that the notification unit 1514, the request receiving unit 1515, and the distribution unit 1516 may be included as processing units in the moving image distribution server 110 described in the above embodiment.

Furthermore, the moving image distribution server 110 in the above embodiment or the moving image distribution server 1510 may include, as processing units, an individual identification unit, a generation unit, a receiving unit which are not illustrated. The individual identification unit in this case identifies an individual captured in video information, with reference to face information in which a face image and individual information indicating the individual are associated with each other. The generation unit generates a digest video including at least a time slot where the individual identified by the individual identification unit is captured in the video information. The receiving unit receives an entry to select the individual information notified by the notification unit 114 or 1514.

The association unit 1511 of the video management system 1500 corresponds to the association unit 111 described in the above embodiment. Moreover, the association unit 1511 may be included in the information transmitting terminal or in the moving image distribution server 1510, or may be a standalone device.

Figure 16:
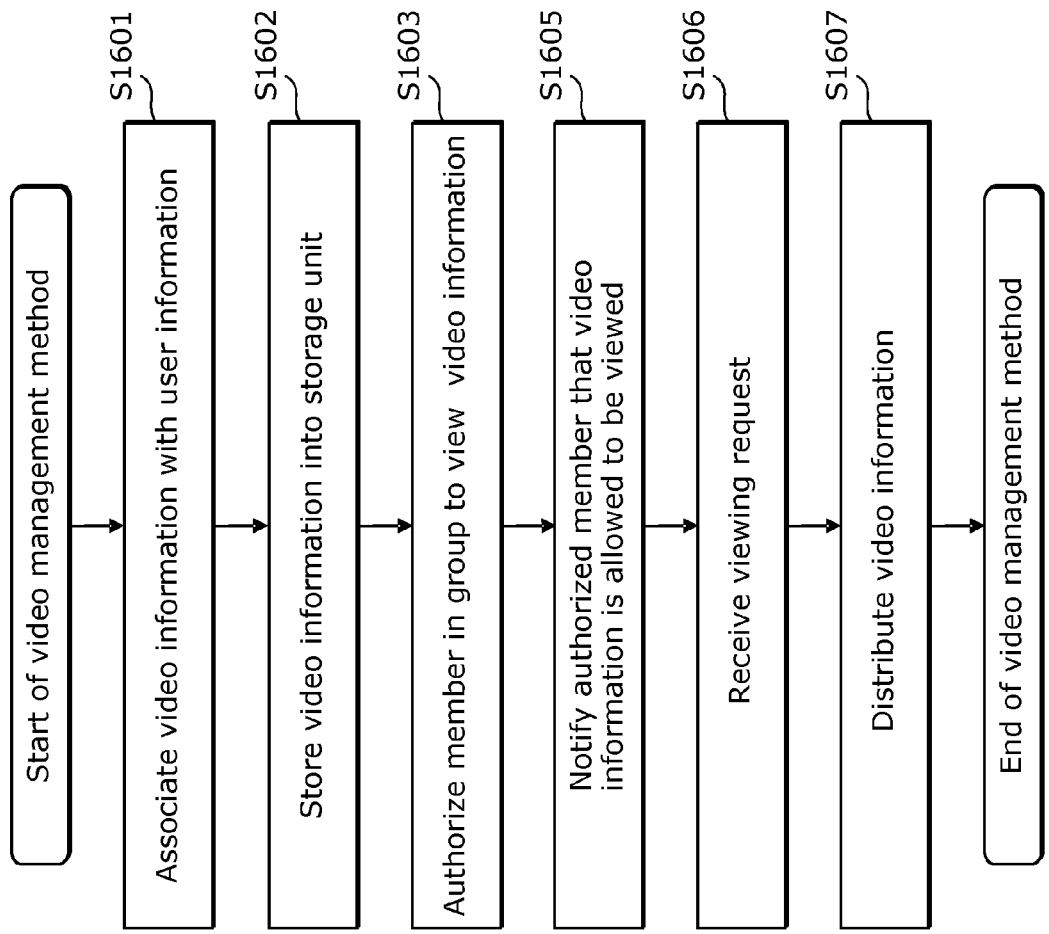
FIG. 16 is a flowchart of a video management method according to another embodiment.

The video management system 1500 as described above performs at least steps of the flowchart shown in FIG. 16.

More specifically, video information to be uploaded by a user to the moving image distribution server is associated with user information indicating the user (S1601: Step of associating).

Next, the video information uploaded via the Internet is stored into the storage unit 1512 (S1602: Step of storing).

Next, a different user is authorized to view the video information stored in the storage unit 1512, the different user belonging to the group to which the user indicated by the user information associated with the video information belongs (S1603: Step of authorizing).

Next, the different user authorized to view the video information in Step S1603 is notified that the different user is authorized to view the video information via the Internet (S1604: Step of notifying).

Next, a viewing request is received from the different user to view the video information regarding which the notification has been made (S1605: Step of receiving)

Next, the video information requested through the viewing request received in Step S1605 is distributed to the different user (S1606: Step of distributing), and the processing ends here.

It should be noted that the above description is merely an example. The present invention is not intended to be limited to the scope of the above description, and is useful in various applications.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image decoding apparatus according to each of the embodiments is a program described below.

To be more specific, the program causes a computer to execute a video management method of managing video information which is uploaded to a server by a user belonging to a group including a virtual administrator and a plurality of users and which is viewable by at least one different user belonging to the group via the Internet using an information terminal, the video management method including: associating the video information to be uploaded to the server by the user with user information indicating the user; storing the video information uploaded via the Internet into a storage unit; authorizing the different user to view the video information stored in the storage unit, the different user belonging to the group to which the user indicated by the user information associated with the video information belongs; and causing the user to select one process to be executed, at withdrawal of the user from the group, on the video information that the different user belonging to the group is authorized to view, the process being selected from among (i) deleting the video information; (ii) associating the video information with user information indicating the at least one different user belonging to the group; and (iii) associating the video information with administrator information indicating the virtual administrator of the group.

The video management system in one or more aspects according to the present invention have been described. However, the present invention is not limited to these embodiments described above. Other embodiments implemented through various changes and modifications conceived by a person of ordinary skill in the art or through a combination of the structural elements in different embodiments described above may be included in the scope in an aspect or aspects according to the present invention, unless such changes, modifications, and combination depart from the scope of the present invention.

Moreover, the following are also intended to be included in the present invention.

(1) Each of the above-described apparatuses may be, specifically speaking, implemented as a system configured with a microprocessor, a ROM, a RAM, a hard disk unit, a display unit, a keyboard, a mouse, and so forth. The RAM or the hard disk unit stores a computer program. The microprocessor operates according to the computer program and, as a result, each function of the apparatus is carried out. Here, note that the computer program includes a plurality of instruction codes indicating instructions to be given to the microprocessor to achieve a specific function. It should be also noted that each of the above-described apparatuses may be a computer system configured with some or all of a microprocessor, a ROM, a RAM, a hard disk unit, a display unit, a keyboard, a mouse, and so forth.

(2) Some or all of the structural elements included in each of the above-described apparatuses may be realized as a single system Large Scale Integration (LSI). The system LSI is a super multifunctional LSI manufactured by integrating a plurality of structural elements onto a signal chip. To be more specific, the system LSI is a computer system configured with a microprocessor, a ROM, a RAM, and so forth. The RAM stores a computer program. The microprocessor operates according to the computer program and, as a result, the system LSI carries out the function.

Although referred to as the LSI here, it may be referred to as an IC, an LSI, a super LSI, or an ultra LSI depending on the scale of integration. A method for circuit integration is not limited to application of an LSI. It may be implemented as a dedicated circuit or a general purpose processor. It is also possible to use a Field Programmable Gate Array (FPGA) that can be programmed after the LSI is manufactured, or a reconfigurable processor in which connection and setting of circuit cells inside the LSI can be reconfigured.

Moreover, when a circuit integration technology that replaces LSIs comes along owing to advances of the semiconductor technology or to a separate derivative technology, the function blocks should be understandably integrated using that technology. There can be a possibility of adaptation of biotechnology, for example.

(3) Some or all of the components included in each of the above-described apparatuses may be implemented as an IC card or a standalone module that can be inserted into and removed from the corresponding apparatus. The IC card or the module is a computer system configured with a microprocessor, a ROM, a RAM, and so forth. The IC card or the module may include the aforementioned super multifunctional LSI. The microprocessor operates according to the computer program, and as a result, a function of the IC card or the module is carried out. The IC card or the module may be tamper resistant.

(4) The present invention may be the method having, as steps, the characteristic structural elements included in the above-described data analysis system. The method may be a computer program causing a computer to execute the steps included in the method. Moreover, the present invention may be a digital signal of the computer program.

Moreover, the present invention may be the aforementioned computer program or digital signal recorded on a computer-readable recording medium, such as a flexible disk, a hard disk, a CD-ROM, an MO, a DVD, a DVD-ROM, a DVD-RAM, a Blu-ray Disc (BD), or a semiconductor memory. Also, the present invention may be the computer program or digital signal recorded on such a recording medium.

Furthermore, the present invention may be the aforementioned computer program or digital signal transmitted via a telecommunication line, a wireless or wired communication line, a network represented by the Internet, and data broadcasting.

Moreover, the present invention may be a computer system including a microprocessor and a memory. The memory may store the aforementioned computer program and the microprocessor may operate according to the computer program.

Furthermore, by transferring the recording medium having the aforementioned program or digital signal recorded thereon or by transferring the aforementioned program or digital signal via the aforementioned network or the like, the present invention may be implemented by a different independent computer system.

(5) The embodiments and modifications described above may be combined.

The embodiments disclosed thus far only describe examples in all respects and are not intended to limit the scope of the present invention. It is intended that the scope of the present invention not be limited by the embodiments described above, but be defined by the claims set forth below. Meanings equivalent to the description of the claims and all modifications are intended for inclusion within the scope of the following claims.

INDUSTRIAL APPLICABILITY

The present invention is useful as, for example, a video management method and a video management system whereby, at the withdrawal of a user from a group, the right of management of video information can be transferred to another member of the group.

REFERENCE SIGNS LIST

10 Moving image distribution system
11, 110, 150 Moving image distribution server
12 to 15, 120, 130, 140, 150, 160, 1520 to 1560 Video device
100, 1500 Video management system
111, 1511 Association unit
112, 1512 Storage unit
113, 1513 Authorization unit
114 Selection unit
115 Execution unit
1514 Notification unit
1515 Request receiving unit
1516 Distribution unit

The invention claimed is:

1. A video management method of managing video information which is uploaded to a server by a user belonging to a group including a virtual administrator and a plurality of users and which is viewable by at least one different user belonging to the group via an Internet connection using an information terminal, the video management method comprising:

associating the video information to be uploaded to the server by the user with user information indicating the user;

storing the video information uploaded via the Internet connection into a storage unit;

authorizing the different user to view the video information stored in the storage unit, the different user belonging to the group to which the user indicated by the user information associated with the video information belongs; and presenting to the user, at withdrawal of the user from the group, options for a process to be selected by the user, the process to be executed on the video information that the different user belonging to the group is authorized to view, the options for the process including (i) deleting the video information; (ii) transferring to the different user a right of management of the video information by associating the video information with user information indicating the at least one different user belonging to the group; and (iii) transferring to the virtual administrator the right of management of the video information by associating the video information with administrator information indicating the virtual administrator of the group.

2. The video management method according to claim 1, further comprising executing, at the withdrawal of the user from the group, the process selected in the presenting, on the video information that the different user belonging to the group is authorized to view in the authorizing.

3. The video management method according to claim 1, wherein the user information includes a user ID identifying the user and a password which are associated with each other, the video management method further comprises:

receiving the user ID and the password entered by the user; and authenticating the user ID and the password received in the receiving, with reference to the user information associated with the video information stored in advance, and in a case where the user has not been authenticated in the authenticating for a predetermined period of time, the user is considered in the executing to have withdrawn from the group to which the user belongs.

4. The video management method according to claim 1, further comprising:

determining, when the video information is accessed by a user, whether or not the accessing user matches one of the virtual administrator and the user indicated by the user information associated with the video information; and changing a mode to receive an instruction to edit the video information from the accessing user determined as matching one of the virtual administrator and the user indicated by the user information associated with the video information in the determining.

5. The video management method according to claim 1,
wherein, when the user uploading the video information belongs to a plurality of groups, the video information is further associated in the associating with a user ID and a group ID identifying a group selected by the user, and
the different user belonging to the group identified by the group ID associated with the video information in the associating is authorized to view the video information in the authorizing.

6. The video management method according to claim 1, further comprising:
notifying the different user authorized to view the video information in the authorizing that the different user is authorized to view the video information via the Internet connection;
receiving, from the different user, a viewing request to view the video information regarding which the notification has been made; and
distributing, to the different user, the video information requested through the viewing request received in the receiving.

7. The video management method according to claim 6, further comprising
identifying an individual captured in the video information, with reference to face information in which a face image and individual information indicating the individual are associated with each other,
wherein information indicating the video information is notified in the notifying to the different user authorized to view the video information in the authorizing, together with the individual information indicating the individual identified in the identifying.

8. The video management method according to claim 7, further comprising:
generating, from the video information, a digest video including at least a time slot where the individual identified in the identifying is captured; and
receiving an entry to select the individual information notified in the notifying,
wherein the digest video is distributed in the distributing to the different user making the entry received in the receiving, the digest video showing the individual indicated by the individual information received in the receiving.

9. The video management method according to claim 1,
wherein the video information is further associated in the associating with a location and a time where the video information is captured, and
when a location and a time associated with first video information uploaded by a first user belonging to a first group are equal to a location and a time associated with second video information uploaded by a second user belonging to a second group different from the first group, the users belonging to the first group and the users belonging to the second group are authorized in the authorizing to view the first video information and the second video information.

10. A video management system comprising an information transmitting terminal and a server which are connected to each other via an Internet connection,
the information transmitting terminal uploading, to the server, video information created by a user belonging to a group including a virtual administrator and a plurality of users,
the video management system further comprising an association unit configured to associate the video information to be uploaded to the server by the user with user information indicating the user, and
the server including:
a storage unit configured to store the video information uploaded via the Internet connection;
an authorization unit configured to authorize at least one different user to view the video information stored in the storage unit, the different user belonging to the group to which the user indicated by the user information associated with the video information belongs; and
a selection unit configured to present to the user, at withdrawal of the user from the group, options for a process to be selected by the user, the process to be executed on the video information that the different user belonging to the group is authorized to view, the options for the process including (i) deleting the video information; (ii) transferring to the different user a right of management of the video information by associating the video information with user information indicating the at least one different user belonging to the group; and (iii) transferring to the virtual administrator the right of management of the video information by associating the video information with administrator information indicating the virtual administrator of the group.

* * * * *